Jan. 10, 1928.

H. F. HOEVEL 1,655,767

DEVICE FOR CONTROLLING WORK SUPPORTS AND TOOL CARRIAGES

Original Filed Dec. 31, 1921

INVENTOR.
Herman F. Hoevel
BY
Lorka, Kehlenbeck & Mathé
ATTORNEYS.

Patented Jan. 10, 1928.

1,655,767

UNITED STATES PATENT OFFICE.

HERMAN F. HOEVEL, OF NEW YORK, N. Y.

DEVICE FOR CONTROLLING WORK SUPPORTS AND TOOL CARRIAGES.

Application filed December 31, 1921, Serial No. 526,309. Renewed March 8, 1926.

My present invention relates to controlling devices for the drive of a movable support carrying the work and of a movable carriage for bringing the tool operating on said work, toward and from said support, particularly for operating on articles of irregular or complicated shapes. My invention has been devised primarily for use in cases in which the work is supported on a turntable, while the operating tool consists of a nozzle on a carriage movable toward and from said turntable, said carriage being so constructed that the operator can ride on it to control the various operations, as will appear more fully from the description following hereinafter. The novel features of the invention will be pointed out in the appended claims.

Figure 1:
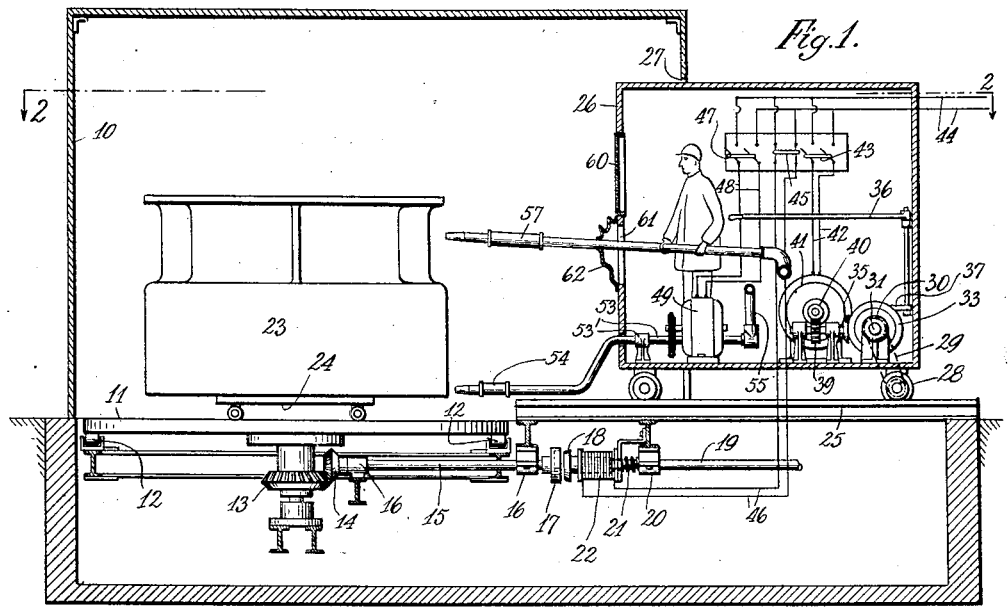
Figure 2:
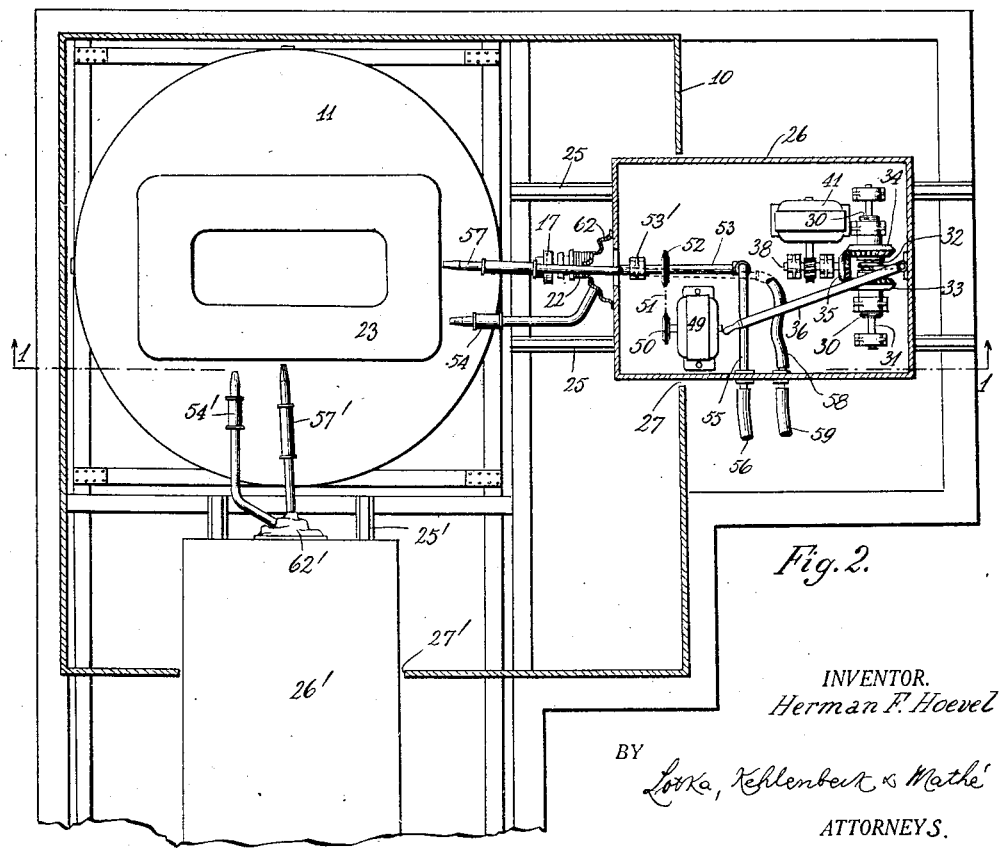

A typical satisfactory example of my present invention is illustrated by the accompanying drawings, in which Fig. 1 is a vertical section on the line 1—1 of Fig. 2, the latter being a plan view, with parts in section on the line 2—2 of Fig. 1.

Within a suitable building 10 I have indicated a turntable 11, supported and driven in any suitable manner. For instance, such turntable may rest on rollers 12 journaled in stationary bearings, and may be connected with a bevel wheel 13 meshing with a bevel pinion 14 on a shaft 15 journaled in stationary bearings 16. At the outer end of this shaft 15, I have shown a clutch member 17 adapted to be engaged at times by a mating clutch member 18 on a shaft 19 extending through a bearing 20 and aligning with said shaft 15. The shaft 19 is driven by an electric motor or other suitable power (not shown), and it will be understood that the clutch member 18, while held to rotate with the shaft 19, is capable of sliding lengthwise thereof. In the particular arrangement illustrated, a spring 21, in engagement with the bearing 20 and with the sleeve of the movable clutch member 18, tends to press the latter into engagement with the companion clutch member 17. The clutch member 18 may however be brought to the retracted or disengaged position indicated in Fig. 1, by the action of a solenoid or magnet coil 22, adapted to receive current in the manner set forth below. The turntable 11 is adapted to carry and revolve about a vertical axis, the article 23 to be treated, trucks such as 24 being used in many cases to transport such articles to and from the turntable.

At the right of Figs. 1 and 2 I have indicated a track 25 on which a carriage 26 is adapted to run toward and from the turntable. Preferably, this carriage fits rather closely into an opening 27 in the corresponding wall of the building 10, so as to reduce the scattering of the sand or other material which is projected against the article 23, by the nozzle or nozzles moving with said carriage 26. The carriage 26 has rollers 28 to travel on the track 25. The drive of the carriage may be effected by means of chains 29 running from sprocket wheels on one of the shafts carrying the rollers 28, to sprocket wheels 30 on a shaft 31 journaled on the carriage and driven in any suitable manner. For instance, a collar 32 may be mounted on said shaft 31 so as to be compelled to rotate therewith, while being free to slide lengthwise of said shaft, said collar having clutch members at its two ends to engage mating clutch members on the opposing or inner faces of two bevel wheels 33, 34 through which the shaft 31 extends loosely, said bevel wheels being held against longitudinal motion. Both bevel wheels are in mesh with the same bevel pinion 35, so that the rotation of the latter will cause the two bevel wheels 33, 34 to rotate in opposite directions. The clutch collar 32 may be brought into engagement with one or the other of these oppositely-rotating bevel wheels by shifting mechanism of well-known character, as by a shifting lever 36 having an arm 37 with a pin fitting into an annular groove of said collar 32. The shaft 38 of the pinion 35 may carry a worm-wheel 39 in mesh with a worm 40 on the shaft of an electric motor 41 supported within the carriage 26. In Fig. 1, I have indicated at 42 the wires for supplying electric current to said motor, a switch 43, within convenient reach of the operator in the carriage, controlling the connection of said wires with the feed wires or live wires 44, which would be contained, preferably, in a flexible cable (not shown) capable of following the movements of the carriage 26.

Within the carriage, at a point easily reached by the operator, I have indicated another switch 45 controlling the connection of the feed wires 44 with wires 46 leading to the magnet or solenoid coil 22.

A third swithch 47, likewise within easy reach of the operator on the carriage 26, controls the connection of the feed wires 44 with the wires 48 for supplying current to an electric motor 49. By means of a sprocket wheel 50 on the motor shaft, a chain 51, and another sprocket wheel 52 on a hollow shaft 53 journaled in bearings 53', said motor 49 drives a rotary nozzle 54 secured on said shaft 53 and eccentric thereto. A mixture of sand and air, or any other substance to be projected against the article 23, is supplied to the shaft 53 and to the nozzle 54 by means of a rigid pipe 55 located within the carriage 26 and connected with the shaft 53 by a suitable joint, and of a flexible pipe 56 connected with said pipe 55 and located exteriorly of the carriage 26, said flexible pipe enabling the supply connection to follow the movement of the carriage. In addition to said rotary, power-driven nozzle 54, I have shown a nozzle 57 adapted to be held and directed by the operator standing in the carriage 26, air and sand (or other material) being supplied to said nozzle 57 by a flexible pipe 58 located within the carriage and by a flexible pipe 59 located outside the carriage and following its movements. The flexible connection 58 enables the operator to move the nozzle in and out relatively to the carriage, and also to swing it up and down as well as laterally. The operator may watch the operations through a window 60. The nozzle 57 preferably extends through an opening 61 in the front wall of the carriage 26, to allow the nozzle to be moved up and down bodily, and a flexible curtain 62 may be provided at this point to prevent the entrance of dust, sand, etc. into the carriage. While I have shown a power-driven rotary nozzle 54 in conjunction with a manually-adjustable, normally stationary nozzle 57, it will be understood that one or the other of these nozzles might be omitted, or a greater number of nozzles might be employed in some cases.

Instead of a single carriage 26, I may, in some cases, employ a plurality of them, so that a plurality of operators could work on different sides of the same article 23 at the same time. Thus in Fig. 2 I have indicated a second track 25', at right angles to the track 25, for a second carriage 26' moving with a sliding fit in an opening 27' in one of the walls of the building 10, Fig. 2 also showing a rotary nozzle 54', a manually-operated nozzle 57', and a curtain 62', corresponding to the similarly designated parts described above in connection with the carriage 26. The second carriage would be provided with motors corresponding to 41 and 49, and with a shifting lever corresponding to 36, as well as with switches corresponding to 43 and 47, with their various adjuncts as described above. In fact, the second carriage might be of exactly the same construction as the first. I consider it desirable, however, for the sake of avoiding interference, to have a switch 45 and wires 46 leading to the coil 22, on only one of the carriages, in case a plurality of carriages are employed.

The operation will be readily understood. All the switches 43, 45, and 47 mounted on the same carriage, as well as the shifting lever 36 of that carriage, are within easy reach of the operator riding on said carriage. By throwing in the switch 43, he may start the motor 41. By then throwing the shifting lever 36 from its central or neutral position (in which the motor 41 is out of driving connection with the shaft 31), the operator may cause the shaft 31 to rotate in one direction or the other, according to the direction in which the shifting lever 36 is moved. The carriage will thus be caused to travel either toward the turntable 11 or from it, as desired, and will be stopped, when desired, by bringing the shifting lever 36 to the neutral position (or by operating the switch 43 to stop the motor 41, although generally it will be preferable to keep this motor running until the entire operation is completed). The operator can thus keep or bring the tips of the nozzles 54 and 57 at, or to, the desired distance from the surface of the article 23 as the position of the latter relatively to the carriage changes owing to the rotation of the turntable 11. This rotation can be started and stopped whenever desired, by the proper operation of the switch 45, the closing of the circuit through the coil 22 operating to disengage the clutch members 17 and 18 and thus to stop the rotation of the turntable, while opening this circuit will cause the spring 21 to bring said clutch members into engagement to rotate the turntable, the clutch member 18 rotating constantly during the entire operation. By the proper operation of the switch 47, the operator can start and stop the rotation of the nozzle 54 as desired. Thus it will be seen that all the operations can be controlled instantly by the operator in the carriage, without his leaving his post in the carriage. When there is more than one carriage, each operator will be able to control independently the motion of his carriage toward and from the turntable 11, and also the starting and stopping of the rotary nozzle 54, if his carriage is provided with such a nozzle. As stated above, it is preferable, when more than one carriage is employed, that the starting and stopping of the turntable 11 should be controlled (by switch 45) from one carriage only.

Various modifications may be made without departing from the nature of my invention as defined in the appended claims.

I claim:

1. An apparatus of the character described, comprising a movable support for the work to be treated, a nozzle carriage movable toward and from said support, means mounted on said carriage and under the control of the operator from his post on the carriage, for starting and stopping said support, and separate means, likewise under the control of the operator from his post on the carriage, for starting and stopping said carriage.

2. An apparatus of the character described, comprising a movable support for the work to be treated, a tool-carriage movable toward and from said support, means mounted on the carriage and under the control of the operator from his post on the carriage, for starting and stopping said support, reversible mechanism for moving said carriage in one direction or the other, and controlling means for said mechanism, under the control of the operator from his post on the carriage.

3. An apparatus of the character described, comprising a movable support for the work to be treated, a tool-carriage movable toward and from said support, power means for causing said carriage to travel in one direction or the other, and controlling means for said power means, under the control of the operator from his post on the carriage.

4. An apparatus of the character described, comprising a movable support for the work to be treated, a carriage movable toward and from said support, a rotary nozzle on said carriage, and separate means located on said carriage for controlling the movement of the carriage and the rotation of said nozzle.

5. An apparatus of the character described, comprising a movable support for the work to be treated, a tool-carriage movable toward and from said support, and a device, under the control of the operator from his post on the carriage, for starting or stopping the movement of said work-support.

6. An apparatus of the character described, comprising a tool-carriage, a support for the work, means mounted on said carriage within the control and convenient reach of the operator riding on said carriage, for causing different portions of the work to be presented to the action of the tool on said carriage, and a device, likewise under the control and within convenient reach of the operator riding on the carriage, for varying the distance between said carriage and said work-support.

7. An apparatus of the character described, comprising a movable support for the work to be treated, a tool-carriage movable toward and from said support, and means within the control and convenient reach of an operator located at a definite point or station, for starting and stopping the operation both of said support and of said carriage.

In testimony whereof I have signed this specification.

HERMAN F. HOEVEL.